(12) United States Patent
Park

(10) Patent No.: US 11,923,913 B2
(45) Date of Patent: Mar. 5, 2024

(54) SATELLITE POINTING SYSTEM AND METHOD OF AUTOMATIC SATELLITE TRACKING ANTENNA USING AUXILIARY LNB

(71) Applicant: WIWORLD CO., LTD., Daejeon (KR)

(72) Inventor: Chan Goo Park, Daejeon (KR)

(73) Assignee: WIWORLD CO., LTD., Daejeon (KR)

( * ) Notice: Subject to any disclaimer, the term of this patent is extended or adjusted under 35 U.S.C. 154(b) by 0 days.

(21) Appl. No.: 17/224,260

(22) Filed: Apr. 7, 2021

(65) Prior Publication Data

US 2021/0391931 A1 Dec. 16, 2021
US 2023/0412287 A9 Dec. 21, 2023

(30) Foreign Application Priority Data

May 18, 2020 (KR) .................. 10-2020-0058938
Sep. 2, 2020 (KR) .................. 10-2020-0111514

(51) Int. Cl.
*H04B 17/27* (2015.01)
*H04B 7/185* (2006.01)
*H04B 17/318* (2015.01)
*H04W 64/00* (2009.01)

(52) U.S. Cl.
CPC ......... *H04B 17/27* (2015.01); *H04B 7/18519* (2013.01); *H04B 17/318* (2015.01); *H04W 64/003* (2013.01); *H04B 7/18502* (2013.01)

(58) Field of Classification Search
CPC .. H04B 17/27; H04B 7/18519; H04B 17/318; H04B 7/18502; H04W 64/003; G01S 19/26; G01S 19/28; H01Q 3/02
See application file for complete search history.

(56) References Cited

U.S. PATENT DOCUMENTS

| 7,146,192 | B2* | 12/2006 | Cooper | H01Q 1/246 |
| | | | | 455/67.11 |
| 9,628,169 | B2 | 4/2017 | Park | |
| 2009/0033575 | A1* | 2/2009 | Dybdal | H01Q 3/04 |
| | | | | 343/757 |
| 2012/0081263 | A1* | 4/2012 | Yang | H01Q 19/17 |
| | | | | 343/880 |
| 2014/0315483 | A1* | 10/2014 | Park | H01Q 1/288 |
| | | | | 455/3.02 |

FOREIGN PATENT DOCUMENTS

KR 20130049390 A 5/2013
KR 101289058 B1 7/2013

\* cited by examiner

*Primary Examiner* — Tejis Daya
(74) *Attorney, Agent, or Firm* — The Webb Law Firm

(57) ABSTRACT

Provided is a satellite pointing system and a satellite pointing method of an automatic satellite tracking antenna using auxiliary LNBs including: an antenna unit configured by coupling a main feeder receiving a satellite broadcast signal and two or more auxiliary feeders to an antenna and a controller tracking a location of a target satellite by analyzing strength of each satellite signal received through the auxiliary feeders and generating a control signal for controlling a pointing direction of the antenna unit based on location information of the tracked target satellite.

9 Claims, 6 Drawing Sheets

SATELLITE POINTING SYSTEM AND METHOD OF AUTOMATIC SATELLITE TRACKING ANTENNA USING AUXILIARY LNB

CROSS-REFERENCE TO RELATED APPLICATIONS

This application claims priority to Korean Patent Application No. 10-2020-0058938 filed May 18, 2020 and No. 10-2020-0111514 filed Sep. 2, 2020, the disclosures of which are hereby incorporated by reference in their entireties.

BACKGROUND OF THE INVENTION

Field of the Invention

The following disclosure relates to a satellite pointing system and a satellite pointing method of an automatic satellite tracking antenna using auxiliary low noise block down converters (LNBs), and in particular, to a satellite pointing system and a satellite pointing method of an automatic satellite tracking antenna using auxiliary LNBs capable of controlling a pointing direction of a parabola antenna that tracks a satellite, while changing an elevation angle and an azimuth angle, such that a main feeder located at the center and receiving a satellite broadcast signal moves to a location where strength of a satellite signal is the largest.

Description of Related Art

Satellite broadcasting services in the United States representatively include Direc TV and Dish Network.

In the case of an antenna for receiving these two satellite broadcasting services, a basic low noise block down converter (LNB) (main LNB) and an additional LNB (auxiliary LNB) are mounted for receiving satellite signals.

Antennas of the related art generally receive only one satellite signal, but the two satellite broadcasting services mentioned above operate upon receiving three or more satellite signals simultaneously through the basic LNB, and thus, the basic LNB is referred to as a single wire multiswitch (SWM) LNB, and signals are simultaneously received from several satellites.

In the case of satellite broadcasting services through such SWM LNB, through internal communication through a set-top box, auto gain control (AGC) or the like is performed and a secure protocol and an output signal level is not uniform and irregularly changes due to external factors such as a change in a TV channel, additional receiver connection, a change in strength of a satellite signal, etc., and thus, a satellite signal output is frequently changed. For this reason, the highest point of a satellite signal strength cannot be determined, making it difficult to detect a signal strength for tracking, and thus, an antenna cannot be accurately positioned in a direction of a desired satellite.

In order to solve this problem, in the related art, a satellite direction is located using an additional LNB (satellite tracking LNB) installed separately from a main LNB (broadcasting LNB) and an antenna is moved at a certain angle to be positioned in a desired satellite direction. However, this also has an error of a device itself or a pointing error due to shaking of a satellite signal itself. In addition, even if a distance and an angle difference between the main LNB and the additional LNB are known, an azimuth angle toward a peak point (the highest point of the satellite signal strength) varies depending on an elevation angle, and thus, both the azimuth angle and the elevation angle should be considered, and in the case of an antenna, signal loss is very large even if an angle is shifted by only 2°, and thus, it is very important to accurately position the antenna in a desired satellite direction.

RELATED ART DOCUMENT

Patent Document (Patent document 1) Korean Patent Registration No. 10-1289058 (Registration date: Jul. 10, 2013).

SUMMARY OF THE INVENTION

An exemplary embodiment of the present disclosure is directed to providing a satellite pointing system and a satellite pointing method of an automatic satellite tracking antenna using auxiliary LNBs, capable of controlling a pointing direction of an antenna by determining an accurate position of a target satellite using satellite signals received from two or more auxiliary feeders and calculating a satellite orientation direction in which the main feeder may receive the highest value of a satellite signal from the target satellite in an antenna system including the main feeder and two or more auxiliary feeders.

In one general aspect, a satellite pointing system of an automatic satellite tracking antenna using auxiliary LNBs includes: an antenna unit 100 configured by coupling a main feeder 10 receiving a satellite broadcast signal and two or more auxiliary feeders 20 to an antenna and a controller 200 tracking a location of a target satellite by analyzing strength of each satellite signal received through the auxiliary feeders 20 and generating a control signal for controlling a pointing direction of the antenna unit 100 based on location information of the tracked target satellite.

Further, in the antenna unit 100, the two or more auxiliary feeders 20 may be spaced equally apart from each other at a predetermined interval based on the main feeder 10.

Further, in the antenna unit 100, elevation angles of the main feeder 10 and the two or more auxiliary feeders 20 may be the same.

Further, in the antenna unit 100, the two or more auxiliary feeders 20 may be spaced apart from each other by a predetermined distance based on the main feeder 10 and coupled to each other.

Further, the controller 200 may receive a satellite signal from one selected auxiliary feeder 20a, analyze current location information using the received satellite signal, and calculate a satellite orientation direction of the antenna unit 100 according to the analyzed current location information to first generate a control signal.

Further, the controller 200 may receive a satellite signal from another selected auxiliary feeder 20b, analyze current location information using the received satellite signal, and calculate a satellite orientation direction of the antenna unit 100 according to the analyzed current location information, and compare the satellite orientation direction information based on the one auxiliary feeder 20a and the satellite orientation direction information based on the other auxiliary feeder 20b to correct the first generated control signal based on the one auxiliary feeder 20a to generate a final control signal.

The satellite pointing system of the automatic satellite tracking antenna using auxiliary LNBs may further include a switching unit 300 switched under the control of the controller 200 to select an operation of one auxiliary feeder 20a or 20b among the two or more auxiliary feeders 20.

Further, the controller 200 may simultaneously receive satellite signals from the two or more auxiliary feeders 20, analyze current location information using the received satellite signals, and calculate a satellite orientation direction of the antenna unit 100 according to the analyzed current location information to first generate a control signal, calculate each of satellite orientation directions using each of satellite signals simultaneously received from the two or more auxiliary feeders 20, and compare satellite orientation direction information based on one auxiliary feeder 20a and satellite orientation direction information based on the other auxiliary feeder 20b to correct the first generated control signal to generate a final control signal for controlling a pointing direction of the antenna unit 100.

In another general aspect, a satellite pointing method of an automatic satellite tracking antenna using auxiliary LNBs includes: an origin checking operation (S100) of determining, by a controller, a current location of an antenna to check an origin; a satellite signal receiving operation (S200) of receiving, by the controller, a satellite signal by controlling operations of two or more auxiliary feeders configured to be coupled to the antenna; a control operation (S300) of tracking, by the controller, a target satellite by analyzing strength of the satellite signal received in the satellite signal receiving operation (S200) and generating a control signal for controlling a pointing direction of the antenna based on the tracked target satellite information; and a satellite pointing operation (S400) of moving, by the controller, a location of the antenna according to the control signal generated in the control operation (S300).

The satellite signal receiving operation (S200) may further include a first receiving operation (S210) of receiving a satellite signal from one selected auxiliary feeder, and after the first receiving operation (S210) is performed, the control operation (S300) may further include a first control operation (S310) of analyzing current location information of the target satellite using the satellite signal received in the first receiving operation (S210) and calculating a satellite orientation direction of the antenna according to the analyzed current location information to first generate a control signal.

Further, after performing the first receiving operation (S210) and the first control operation (S310), the satellite signal receiving operation (S200) may further include a second receiving operation (S220) of receiving a satellite signal from another selected auxiliary feeder, and after the second receiving operation (S220) is performed, the control operation (S300) may further include: a second control operation (S320) of analyzing current location information of the target satellite using the satellite signal received in the second receiving operation (S220), calculating a satellite orientation direction of the antenna according to the analyzed current location information, comparing the calculated satellite orientation direction and the satellite orientation direction information based on the first control operation (S310), and correcting the control signal based on the first control operation (S310) to generate a final control signal for controlling a pointing direction of the antenna.

Further, the satellite signal receiving operation (S200) may further include a simultaneous receiving operation (S230) of simultaneously receiving satellite signals from the two or more auxiliary feeders, and the control operation (S300) may further include a simultaneous control operation (S330) of analyzing current location information of a target satellite collectively using the satellite signals simultaneously received in the simultaneous receiving operation (S230), calculating a satellite orientation direction of the antenna according to the analyzed current location information to first generate a control signal, calculating each of the satellite orientation directions using each of the satellite signals simultaneously received from the two or more auxiliary feeders, comparing the satellite orientation direction information based on one auxiliary feeder and the satellite orientation direction information based on the other auxiliary feeder to correct the first generated control signal to generate a final control signal for additionally controlling a pointing direction of the antenna.

Further, in the satellite pointing operation (S400), the location of the antenna may be moved according to the final control signal.

Other features and aspects will be apparent from the following detailed description, the drawings, and the claims.

DESCRIPTION OF THE INVENTION

Figure 1:
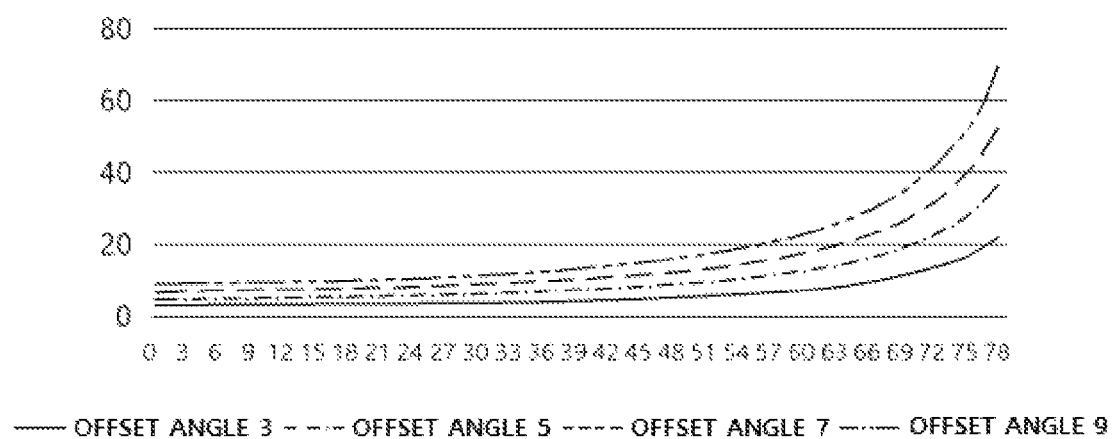
FIG. 1 is a graph showing a change in azimuth angle according to an elevation angle considered in a satellite pointing system and a satellite pointing method of an automatic satellite tracking antenna using auxiliary LNBs according to an exemplary embodiment of the present disclosure.

Hereinafter, a satellite pointing system and a satellite pointing method of an automatic satellite tracking antenna using auxiliary LNBs of the present disclosure will be described in detail with reference to the accompanying drawings. The drawings are provided as examples in order to convey the spirit of the present invention to those skilled in the art. Therefore, the present invention is not limited to the drawings presented hereinafter and may be embodied in other forms. Throughout the specification, the same reference numbers will be used to refer to the same or like components.

If there are no other definitions of technical terms and scientific terms used here, the technical terms and scientific terms have the meanings commonly understood by those skilled in the art to which the present invention pertains, and in the following description and accompanying drawings, descriptions of known functions and components that may unnecessarily obscure the subject matter will be omitted.

In addition, a system refers to a set of components including apparatuses, devices, and means which are organized and regularly interact with each other to perform a required function.

In general, in the case of an antenna system, a separation angle of an elevation angle is fixed, so that a certain predetermined separation angle may be easily corrected, but in the case of an azimuth angle, the azimuth angle to be corrected varies according to an elevation angle, and thus, if only the azimuth angle is simply corrected, an orientation direction to a desired target satellite cannot be calculated.

In addition, if an elevation angle of an instrument is different from an expected angle due to external factors such as inclination of the instrument itself, clearance, etc., an error occurs in a correction value itself, so that the orientation direction to the desired target satellite cannot be accurately calculated.

Conventionally, a technology of generating a control signal for moving a main feeder (broadcasting LNB) to a maximum point of signal satellite strength using a latitude and longitude at a current location obtained through two satellite signals received through the main feeder and an additional feeder (auxiliary feeder) coupled to one side of the main feeder is used.

That is, in order to point the main feeder to the maximum point of the satellite signal strength at an elevation angle at which the maximum point of the satellite signal strength is detected, a control signal may be generated by moving the antenna by a length f(θ, α) which is a function of a distance (α) between the elevation angle (θ) of the corresponding point and two feeders (main feeder and additional feeder). However, if an actual elevation angle is θ+x due to an error (x) occurring due to a limit, an instrument itself, an inclination, etc., the antenna may move by f(θ+x, α), and thus, pointing to the maximum point of the satellite signal strength is not actually made. As a result, signal loss may increase or it is impossible to watch TV.

In other words, FIG. 1 is a graph showing a change in azimuth angle according to an elevation angle considered in a satellite pointing system and a satellite pointing method of an automatic satellite tracking antenna using auxiliary LNBs according to an exemplary embodiment of the present disclosure. Since the change in azimuth angle according to the elevation angle is not considered in the related art, the moved main feeder cannot point to the highest point of the satellite strength, thereby increasing signal loss or making it impossible to watch TV.

That is, an offset of FIG. 1 is an interval between the main feeder and one additional feeder in the related art, and when an azimuth angle and an elevation angle are calculated using an orbit of a target satellite (orbit of satellite represented in longitude) and current location information of the antenna, it can be seen that the azimuth angle to be corrected increases as the elevation angle increases, but in the related art, the change in azimuth angle according to the elevation angle is not considered, causing a problem that the moved main feeder cannot point the highest point of the satellite strength.

$$E = \arctan\left[\frac{\cos(G)\cos(L) - 0.1512}{\sqrt{1 - \cos^2(G)\cos^2(L)}}\right]$$

$$A = 180 + \arctan\left[\frac{\tan(G)}{\tan(L)}\right]$$

Here, E is the elevation angle, S is the longitude of the target satellite, N is the longitude of the current location of the antenna, L is the latitude of the current location of the antenna, A is the azimuth angle, and G is a longitude difference between the target satellite and the current location of the antenna.

That is, if the orbit of the target satellite is fixed and the antenna knows the elevation angle information at which the antenna moves, while receiving a satellite signal of a particular satellite, the current location information may be known, and thus, an angle for controlling a pointing direction to the target satellite may be calculated by calculating the location of the target satellite based on the particular satellite. However, as described above, if the elevation angle information is incorrect due to various external factors, the angle calculated to control the pointing direction to the target satellite is inevitably incorrect.

In other words, as summarized in Table 1 below, in the related art antenna system including the main feeder and one additional feeder, if a predetermined elevation angle error occurs, the angle at which the antenna should move is different. Therefore, in order to efficiently solve this problem, in the satellite pointing system and the satellite pointing method of an automatic satellite tracking antenna using auxiliary LNBs according to an exemplary embodiment of the present disclosure, an antenna system is configured to include two or more auxiliary feeders, thereby accurately controlling pointing of the main feeder.

TABLE 1

| | | |
|---|---|---|
| Separation angle of one auxiliary feeder and main feeder based on design | 3° | 3° |
| Elevation angle error of instrument | 0° | 10° |
| Calculated elevation angle value for pointing target satellite from current location | 46° | 46° |
| Elevation angle for pointing satellite recognized by antenna | 46° | 36° |
| Angle at which antenna moves for pointing main feeder | 1/cos46 * 3 = 4.31° | 1/cos36 * 3 = 3.70° |

In order to solve the problems, a satellite pointing system and a satellite pointing method of an automatic satellite tracking antenna using auxiliary LNBs according to an exemplary embodiment of the present disclosure relate to an antenna system and a satellite pointing method using the same for controlling an orientation direction of a main feeder to have the highest value of a satellite signal of a target satellite using the satellite signal of the target satellite received through at least two or more auxiliary feeders installed to be spaced apart from each other by a predetermined distance based on the main feeder which receives a satellite broadcast signal for smooth satellite tracking in performing satellite tracking using a parabola antenna that tracks the target satellite by changing an elevation angle and an azimuth angle.

That is, even if an elevation angle error occurs due to external factors, etc. in an instrument of the antenna tracking a satellite using a parabolic antenna, an azimuth angle direction of the main feeder may be accurately specified by correcting satellite signals received by the auxiliary feeders using two or more auxiliary feeders installed to be spaced apart from each other by a predetermined distance based on the main feeder, whereby a satellite may be easily tracked and an orientation direction toward the target satellite may be accurately calculated.

Figure 2:
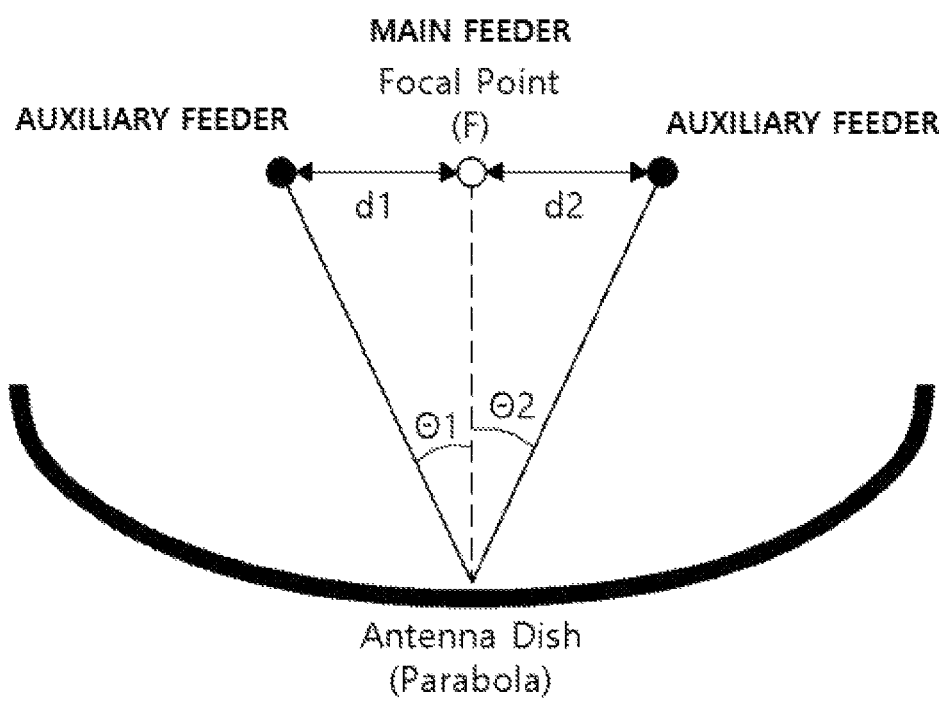
FIGS. 2 and 3 are diagrams illustrating a configuration of an antenna unit of a satellite pointing system and a satellite pointing method of an automatic satellite tracking antenna using auxiliary LNBs according to an exemplary embodiment.

To this end, in the satellite pointing system and the satellite pointing method of an automatic satellite tracking antenna using auxiliary LNBs according to an exemplary embodiment of the present disclosure, as shown in FIG. 2, by including two or more auxiliary feeders spaced apart from each other by a predetermined interval based on the main feeder and located at the same elevation angle, a movement distance by f(θ, d1) is calculated by tracking a target satellite using one selected auxiliary feeder, and a movement distance by f(θ, d2) is calculated by tracking the target satellite using another auxiliary feeder.

Figure 3:
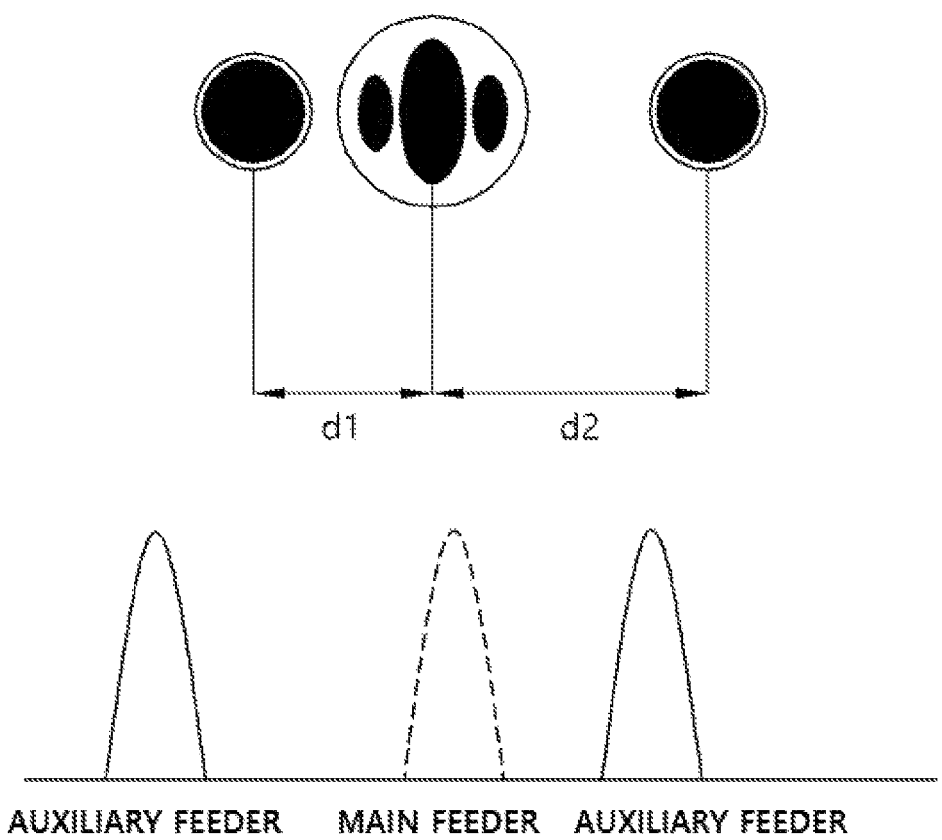

Of course, in order to maximize signal reception from the target satellite in general, it is most preferable to symmetrically design two or more auxiliary feeders based on the main feeder as shown in FIG. 2, but the two or more auxiliary feeders may be set to be spaced apart from each other by a predetermined distance based on the main feeder by reflecting a focal point F of a parabolic antenna at the time of design as shown in FIG. 3.

In this case, when designing the parabolic antenna, the focal point F is set by setting a curvature, based on which when the two or more auxiliary feeders are coupled to be spaced apart from each other by the predetermined distance, the movement distance by f(θ, d1) is calculated by tracking the target satellite using one auxiliary feeder selected by applying $$\theta = \tan^{-1}\frac{d}{F},$$

and the movement distance by f(θ, d2) is calculated by tracking the target satellite using the other auxiliary feeder.

In this manner, the orientation direction control signal allowing the orientation direction of the main feeder to have the highest value of the satellite signal of the target satellite may be calculated using the space information between the feeders, the orbit information of the target satellite through the satellite signal received from the target satellite, and the current location information based on the location information of the two or more auxiliary feeders based on the main feeder.

Figure 4:
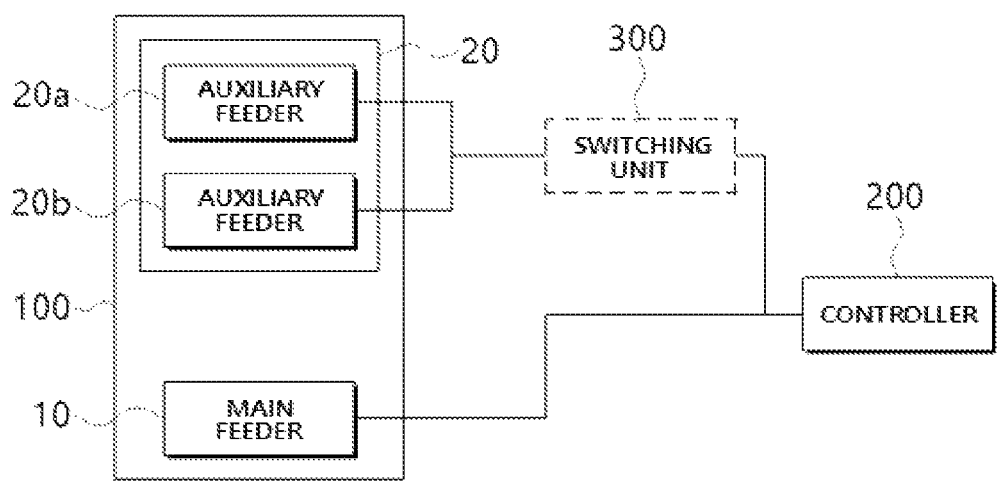
FIG. 4 is a diagram illustrating a configuration of a satellite pointing system of an automatic satellite tracking antenna using auxiliary LNBs according to an exemplary embodiment of the present disclosure.

In order to have these technical features, the satellite pointing system of an automatic satellite tracking antenna using auxiliary LNBs according to an exemplary embodiment of the present disclosure may include the antenna unit 100 and the controller 200 as shown in FIG. 4.

Each component will be described in detail.

The antenna unit 100 may include the main feeder 10 receiving a satellite broadcast signal and two or more auxiliary feeders 20 coupled to the antenna.

In the antenna unit 100, a symmetrical design is most preferable in terms of characteristics of a parabolic antenna for maximizing signal reception from a target satellite, since, the two or more auxiliary feeders 20 are spaced apart from each other equally at a predetermined interval and coupled based on the main feeder 10, and the main feeder 10 and the two or more auxiliary feeders 20 may be coupled to have the same elevation angle.

However, it is also possible to couple the two or more auxiliary feeders 20 so as to be spaced apart by a predetermined distance based on the main feeder 10 with respect to a focal length of the parabola.

In other words, in the antenna unit 100, an accurate location of the main feeder 10 may be known by applying an azimuth angle point of each of the two or more auxiliary feeders 20 based on the main feeder 10 as a proportional expression, regardless of offset of the azimuth angle based on the elevation angle, using location information (space information) of the two or more auxiliary feeders 20 based on the main feeder 10 and an azimuth angle directed by the two or more auxiliary feeders 20 at the time of design, and in addition, the accurate position of the main feeder 10 may be applied to analyze strength of a received satellite signal, so that a satellite may be easily tracked and an orientation direction toward the target satellite may be accurately calculated.

For example, when the two or more auxiliary feeders 20 are spaced equally spaced apart from each other at a predetermined interval based on the main feeder 10 and are coupled, even if an elevation error (x) occurs, the main feeder may be directed to a middle point of f(θ+x, d1) and f(θ+x, d2) because the main feeder and two or more auxiliary feeders are coupled to have the same elevation angle, whereby the main feeder may receive a satellite signal of the highest point for the target satellite.

As another example, when a separation angle of any one of the auxiliary feeders 20 based on the main feeder 10 is 3° and a separation angle of the other auxiliary feeder 20 is 5°, one auxiliary feeder 20 tracking the target satellite (e.g., satellite at 116°) has a maximum point at a pointing of azimuth angle 113° and the other auxiliary feeder 20 has a maximum point at a point of azimuth angle 121°. When the antenna is controlled by setting an included angle of 8° between one auxiliary feeder 20 and the other auxiliary feeder as a separation rate, the main feeder 10 may receive a maximum signal of a satellite signal, while moving to be located at the azimuth angle of 116°.

The controller 200 may track the satellite by analyzing the strength of the satellite signal received through the auxiliary feeder 20, and generate a control signal for controlling a pointing direction of the antenna unit 100 based on the tracked satellite information.

In other words, the controller 200 may generate the control signal by calculating a satellite orientation direction of the antenna unit 100 so that the antenna unit 100 may be accurately directed to the target satellite.

In addition, the satellite pointing system of the automatic satellite tracking antenna using auxiliary LNBs according to an exemplary embodiment of the present disclosure may further include a driving unit (not shown) for moving the antenna unit 100 according to the control signal generated by the controller 200.

The driving unit may include various motors and components for controlling a pointing direction of the antenna unit 100.

Controller—First Exemplary Embodiment

To this end, the controller 200 may generate the control signal by calculating the satellite orientation direction of the antenna unit 100 by controlling an operation of each of the two or more auxiliary feeders 20.

In detail, a satellite signal may be received from selected on auxiliary feeder 20a and analyzed to recognize satellite information and current location information, and a satellite orientation direction of the antenna unit 100 may be calculated according to the recognized current location information to first generate the control signal. In detail, the controller 200 may receive a satellite signal from the auxiliary feeder 20a, analyze the received satellite signal, and calculate current satellite information and current location information using an angle of a point at which strength of the satellite signal is peak and strength of the satellite signal at that time.

In this manner, the first generated control signal is the same as that of the related art in consideration of only one auxiliary feeder 20a.

However, in the satellite pointing system of an automatic satellite tracking antenna using auxiliary LNBs according to an exemplary embodiment of the present disclosure, as described above, a satellite signal may be received from another selected auxiliary feeder 20b and analyzed to recognize satellite information and current location information, and a satellite orientation direction of the antenna unit 100 may be calculated according to the recognized current location information. Also, in this case, the satellite signal may be received from the auxiliary feeder 20b and analyzed, and the current satellite information and the current location information may be calculated using an angle at which strength of the satellite signal is peak and strength of the satellite signal at that time.

Here, the controller 200 may compare the satellite orientation direction information (elevation angle information to satellite) based on one auxiliary feeder 20a and satellite orientation direction information (elevation angle information to satellite) based on the other auxiliary feeder 20b and correct the control signal based on one auxiliary feeder 20a to a predetermined point of the satellite orientation direction information based on the other auxiliary feeder 20b to generate a final control signal.

Here, the final control signal may be generated by correcting the control signal based on one auxiliary feeder 20a by applying location related information of one auxiliary feeder 20a and the other auxiliary feeder 20b as a relational expression based on the predetermined point and the main feeder 10.

The satellite pointing system of the automatic satellite tracking antenna using the auxiliary LNBs according to an exemplary embodiment of the present disclosure may further include the switching unit 300 as shown in FIG. 3 to control an operation of each of the two or more auxiliary feeders 20.

The switching unit 300 may be switched under the control of the controller 200 to select an operation of one auxiliary feeder 20a or 20b among the two or more auxiliary feeders 20. Here, the switching unit 300 is a component for controlling the operation of the selected one auxiliary feeder 20a or 20b and may be configured as a digital satellite equipment control (DiSEqC) switch as an automatic satellite selector or may be configured as an individual switch connected to each auxiliary feeder 20 but the present disclosure is not limited thereto.

In addition, in calculating the satellite orientation direction by the two or more auxiliary feeders 20, the received satellite signal is analyzed to track at least four satellites to recognize orbits, elevation angle, and azimuth angle information of the tracked satellite, and current latitude and longitude location information may be calculated using the recognized two or more satellite information.

Thereafter, satellite orientation direction information to be moved may be calculated through the current location information such that strength of the satellite signal is the largest.

Controller—Second Exemplary Embodiment

In addition, the controller 200 may generate the control signal by calculating satellite orientation direction of the antenna unit 100 by simultaneously controlling operations of the two or more auxiliary feeders 20.

In detail, the controller 200 simultaneously receives satellite signals from the two or more auxiliary feeders 20, collectively analyzes the received satellite signals to recognize satellite information and current location information, and calculate the satellite orientation direction of the antenna unit 100 according to the recognized current location information to first generate the control signal. That is, the controller 200 may calculate the current satellite information and the current location information using the angle of the point at which strength of the satellite signal with respect to the satellite signal received by the two or more auxiliary feeders 20 was peak and the strength of the satellite signal at that time.

Thereafter, the satellite signals simultaneously received from the two or more auxiliary feeders 20 may be analyzed to calculate the satellite orientation directions, and the satellite orientation direction information based on one auxiliary feeder 20a and the satellite orientation information based on the other auxiliary feeder 20b may be compared to correct the first generated control signal to generate a final control signal.

In detail, the first generated control signal may be corrected to a predetermined point of the satellite orientation direction information based on the one auxiliary feeder 20a and the satellite orientation direction information based on the another auxiliary feeder 20b.

At this time, the final control signal may be generated by correcting the control signal based on one auxiliary feeder 20 by applying the predetermined point and location related information of the one auxiliary feeder 20a and the other auxiliary feeder 20b as a relational expression with respect to the main feeder 10.

In this case, the configuration of the switching unit 300 for selecting the operation of any one auxiliary feeder 20a or 20b among the two or more auxiliary feeders 20 is not required.

In addition, in calculating the satellite orientation direction by the two or more auxiliary feeders 20, four or more satellites may be tracked by analyzing received satellite signals, an orbit, an elevation angle, and azimuth angle information of the tracked satellites may be recognized, and current latitude and longitude location information may be calculated using two or more recognized satellite information.

Thereafter, it is possible to calculate satellite orientation direction information to be moved through the current location information so as to direct to a direction in which strength of the satellite signal is the largest.

Figure 5:
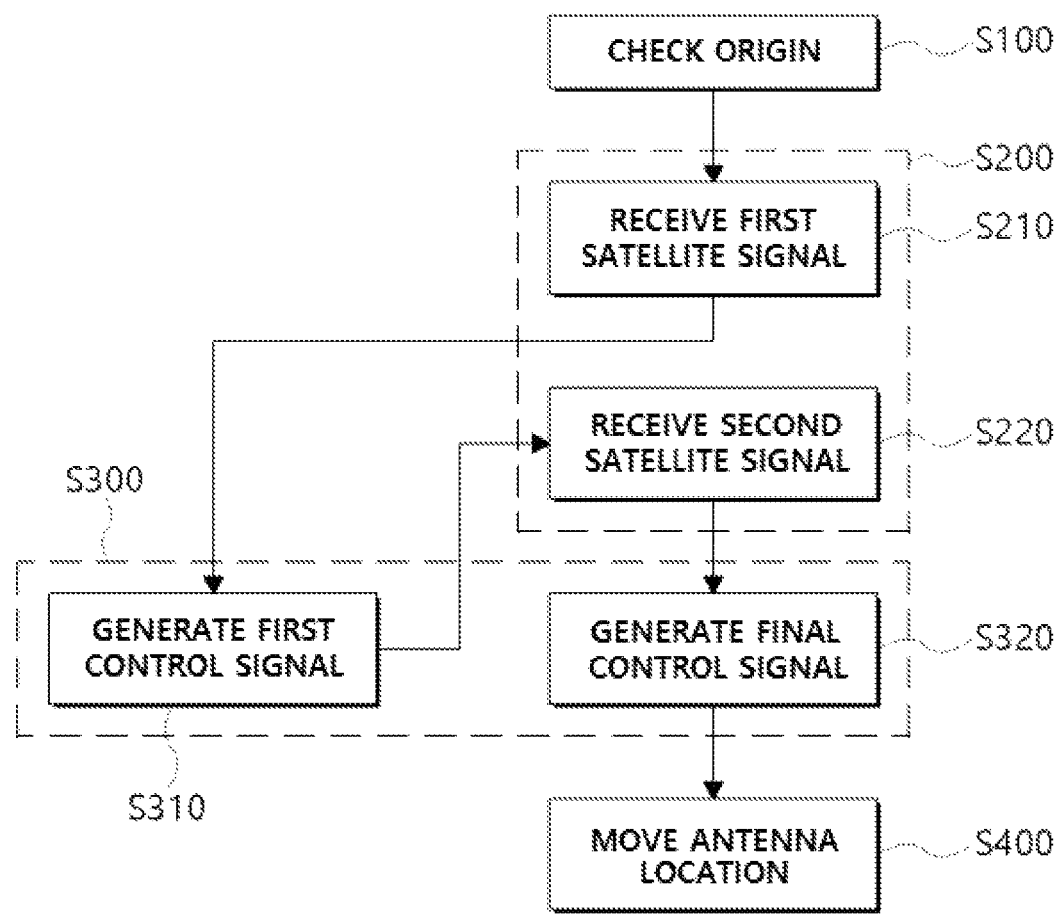
FIGS. 5 and 6 are flowcharts illustrating a satellite pointing method of an automatic satellite tracking antenna using auxiliary LNBs according to an exemplary embodiment of the present disclosure.
Figure 6:
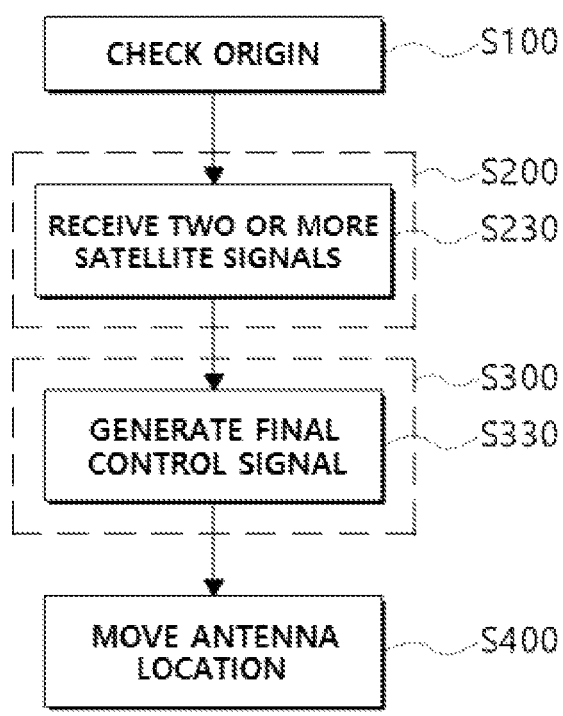

FIGS. 5 and 6 are flowcharts illustrating a satellite pointing method of an automatic satellite tracking antenna using auxiliary LNBs according to an exemplary embodiment of the present disclosure, and the satellite pointing method of an automatic satellite tracking antenna using auxiliary LNBs according to an exemplary embodiment of the present disclosure will be described in detail with reference to FIGS. 5 and 6.

As shown in FIGS. 5 and 6, the satellite pointing method of an automatic satellite tracking antenna using auxiliary LNBs according to an exemplary embodiment of the present disclosure may include an origin checking operation (S100), a satellite signal receiving operation (S200), a control operation (S300), and a satellite pointing operation (S400).

Each operation will be described in detail.

In the origin checking operation (S100), the controller 200 may check the origin by determining a current location of the antenna unit 100.

That is, when the antenna system is turned on and power is applied, the antenna unit 100 moves to an operation origin position STOW to wait for a signal.

In the satellite signal receiving operation (S200), the controller 200 may receive a satellite signal by controlling an operation of the two or more auxiliary feeders 20 configured to be coupled to the antenna unit 100.

At this time, the two or more auxiliary feeders 20 may be coupled to have the same elevation angle as that of the main feeder 10 and are spaced apart from each other at the same interval based on the main feeder 10, but the two or more auxiliary feeders 20 may be coupled to be spaced apart from each other by a predetermined distance based on the main feeder 10 based on a focal length of a parabola.

In other words, in the antenna unit 100, an accurate location of the main feeder 10 may be known by applying as a proportional expression, regardless of offset of the azimuth angle based on the elevation angle, using location information (space information) of the two or more auxiliary feeders based on the main feeder 10 and an azimuth angle pointed by the two or more auxiliary feeders 20 at the time of design, and in addition, the accurate position of the main feeder may be applied to analyze strength of a received satellite signal, so that a satellite may be easily tracked and an orientation direction toward the target satellite may be accurately calculated.

In the control operation (S300), the controller 200 may track the satellite by analyzing strength of the satellite signal received in the satellite signal receiving operation (S200), and generate a control signal for controlling the pointing direction of the antenna unit 100 based on the tracked satellite information.

At this time, as shown in FIG. 5, the satellite pointing method of the automatic satellite tracking antenna using auxiliary LNBs according to an exemplary embodiment of the present disclosure may include the first receiving operation (S210) in the satellite signal receiving operation (S200) to generate the control signal by calculating a satellite orientation direction of the antenna unit 100 by controlling an operation of each of the two or more auxiliary feeders 20.

In the first receiving operation (S210), it is preferable to receive a satellite signal from one selected auxiliary feeder 20a.

Accordingly, after performing the first receiving operation (S210), the control operation (S300) is preferably configured to include a first control operation (S310) as shown in FIG. 5.

In the first control operation (S310), it is preferable to analyze the satellite signal received in the first receiving operation (S210), recognize satellite information and current location information, and calculate a satellite orientation direction of the antenna unit 100 according to the current location information to first generate the control signal. In detail, in the first control operation (S310), it is preferable to calculate the current satellite information and the current location information using an angle of a point at which strength of the satellite signal with respect to the received satellite signal was peak and strength of the satellite signal at that time.

In this manner, the first generated control signal is the same as that of the related art in consideration of only one auxiliary feeder 20a.

However, as shown in FIG. 5, the satellite pointing method of the automatic satellite tracking antenna using the auxiliary LNBs according to an exemplary embodiment of the present disclosure may further include a second receiving operation (S220) of receiving a satellite signal from the other auxiliary feeder 20b selected in the satellite signal receiving operation (S200), after the first receiving operation (S210) and the first control operation (S310) are performed.

The control operation (S300) is also preferably configured to further include a second control operation (S320) after performing the second receiving operation (S220).

In the second control operation (S320), satellite information and current location information are recognized according to the satellite signal received in the second receiving operation (S220), and a satellite orientation direction of the antenna unit 100 is calculated according to the recognized current location information.

Thereafter, the satellite orientation direction information based on the first control operation (S310) and the satellite orientation direction information based on the second control operation (S320) may be compared to correct the control signal based on the first control operation (S310) to generate a final control signal.

Specifically, most preferably, the current satellite information and the current location information may be calculated using the angle of a point at which strength of the satellite signal for the satellite signal received in the second receiving operation (S220) was peak and strength of the satellite signal at that time through the second control operation (S320), whereby the final control signal may be generated by correcting the control signal to a predetermined point of the satellite orientation direction information based on the first control operation (S310) and the satellite orientation direction information based on the second control operation (S320).

At this time, the final control signal may be generated by correcting the control signal based on the one auxiliary feeder 20a by applying the predetermined point and the location related information of each of the one auxiliary feeder 20a and the other auxiliary feeder 20b as a relational expression based on the main feeder 10.

In addition, in calculating the satellite orientation direction by the two or more auxiliary feeders 20, four or more satellite are tracked by analyzing a received satellite signal to recognize an orbit, an elevation angle, and azimuth angle information of the tracked satellites, and current latitude and longitude location information are calculated using the obtained two or more satellite information.

Thereafter, it is possible to calculate the satellite orientation direction information to move through the current location information so as to direct in a direction in which the strength of the satellite signal is the largest.

In addition, as shown in FIG. 6, the satellite pointing method of the automatic satellite tracking antenna using the auxiliary LNBs according to an exemplary embodiment of the present disclosure may further include a simultaneous receiving operation (S230) in the satellite signal receiving operation (S200) to generate the control signal by calculating the satellite orientation direction of the antenna unit 100 by simultaneously controlling operations of the two or more auxiliary feeders 20.

In the simultaneous receiving operation (S230), it is preferable to simultaneously receive satellite signals from the two or more auxiliary feeders 20.

Accordingly, after performing the simultaneous receiving operation (S230), the control operation (S300) is preferably configured to include a simultaneous control operation (S330) as shown in FIG. 6.

In the simultaneous control operation (S330), it is preferred to collectively analyze the satellite signals simultaneously received in the simultaneous reception operation (S230) to determine satellite information and current location information, calculate a satellite orientation direction of the antenna unit 100 according to the recognized current location information to first generate the control signal, analyze each of strengths of the satellite signals simultaneously received from the two or more auxiliary feeders 20 to calculate each of the satellite orientation directions, and compare the satellite orientation direction information by one auxiliary feeder 20a and the satellite orientation direction information by the other auxiliary feeder 20b to correct the first generated control signal to generate a final control signal.

In the simultaneous control operation (S330), after the current satellite information and the current location information are calculated using an angle of a point at which the strength of the satellite signal for the satellite signal received by the two or more auxiliary feeders 20 was peak and strength of the satellite signal at that time, the first generated control signal is corrected to a predetermined point of the satellite orientation direction information by the one auxiliary feeder 20a and the satellite orientation direction information by the other auxiliary feeder 20b to generate the final control signal.

At this time, the final control signal may be generated by correcting the control signal by the one auxiliary feeder 20a by applying the predetermined point and the location related information of the one auxiliary feeder 20a and the other auxiliary feeder 20b based on the main feeder 10.

In addition, in calculating the satellite orientation direction by the two or more auxiliary feeders 20, at least four or more satellites are tracked by analyzing received satellite signals to recognize an orbit, an elevation angle, an azimuth angle information of the tracked satellites, and the current latitude and longitude location information are calculated using the two or more recognized satellite information.

Thereafter, it is possible to calculate the satellite orientation direction information to move through the current location information so as to direct in a direction in which the strength of the satellite signal is the largest.

In the satellite pointing operation (S400), it is preferable to move the position of the antenna according to the final control signal in the control operation (S300).

According to the satellite pointing system and the satellite pointing method of the automatic satellite tracking antenna using the auxiliary LNBs of the present disclosure according to the configuration as described above, in a parabolic antenna for tracking a satellite, while changing an elevation angle and azimuth angle, a pointing direction of the antenna may be controlled such that the main feeder receiving a satellite broadcast signal moves to a point at which strength of a satellite signal from a target satellite is the largest.

In detail, as an antenna system including a main feeder and two or more auxiliary feeders, an accurate location of a target satellite may be determined using satellite signals received from two or more auxiliary feeders and the main feeder may control a pointing direction of an antenna by calculating a satellite orientation direction at which the main feeder is located at a point at which strength of a satellite signal from the target satellite is largest to receive the satellite signal.

In addition, when a pointing error occurs due to an error of an instrument itself or shaking of a satellite signal itself, an accurate location of the target satellite may be determined using satellite signals received from the two or more auxiliary feeders installed to be spaced apart from each other by a predetermined distance based on the main feeder, whereby the error of the pointing control direction may be corrected.

Meanwhile, the satellite pointing method of an automatic satellite tracking antenna using auxiliary LNBs according to an exemplary embodiment of the present disclosure may be implemented in the form of a program instruction that may be executed through various means for electronically processing information and recorded in a storage medium. The storage medium may include program instructions, data files, data structures, and the like alone or in combination.

The media and program instructions stored in a storage medium may be those specially designed and constructed for the present disclosure or those well known and available to a person skilled in the art of software. Examples of the storage medium include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of the program instructions include both machine code, such as those produced by a compiler, and a high-grade language code that may be executed by a device which electronically processes information using an interpreter, or the like, for example, a computer.

Although the present disclosure has been described in terms of specific items such as detailed elements as well as the limited exemplary embodiments and the drawings, they are only provided to help more general understanding of the invention, and the present disclosure is not limited to the above exemplary embodiments. It will be appreciated by those skilled in the art to which the present disclosure pertains that various modifications and changes may be made from the above description.

Therefore, the spirit of the present disclosure should not be determined to be limited to the described exemplary embodiments, and all equivalents or equivalent modifications to claims to be described later, as well as the claims, are within the scope of the spirit of the present disclosure.

DETAILED DESCRIPTION OF MAIN ELEMENTS

100: antenna unit
10: main feeder 20, 20a, 20b: auxiliary feeder
200: controller
300: switching unit

What is claimed is:

1. A satellite pointing system of an automatic satellite tracking antenna using auxiliary LNBs, the satellite pointing system comprising:
an antenna unit configured by coupling a main feeder receiving a satellite broadcast signal and two or more auxiliary feeders to an antenna; and
a controller tracking a location of a target satellite by analyzing strength of each satellite signal received through the auxiliary feeders and generating a control signal for controlling a pointing direction of the antenna unit based on location information of the tracked target satellite, wherein
the controller receives a satellite signal from one selected auxiliary feeder, analyzes current location information using the received satellite signal, and calculates a satellite orientation direction of the antenna unit according to the analyzed current location information to first generate a control signal,
the controller receives a satellite signal from another selected auxiliary feeder, analyzes current location information using the received satellite signal, calculates a satellite orientation direction of the antenna unit according to the analyzed current location information, and
compares the satellite orientation direction information based on the one auxiliary feeder and the satellite orientation direction information based on the other auxiliary feeder to correct the first generated control signal based on the one auxiliary feeder to generate a final control signal.

2. A satellite pointing system of an automatic satellite tracking antenna using auxiliary LNBs, the satellite pointing system comprising:
an antenna unit configured by coupling a main feeder receiving a satellite broadcast signal and two or more auxiliary feeders to an antenna; and
a controller tracking a location of a target satellite by analyzing strength of each satellite signal received through the auxiliary feeders and generating a control signal for controlling a pointing direction of the antenna unit based on location information of the tracked target satellite,
wherein
the controller simultaneously receives satellite signals from the two or more auxiliary feeders, analyzes current location information using the received satellite signals, and calculates a satellite orientation direction of the antenna unit according to the analyzed current location information to first generate a control signal,
calculates each of satellite orientation directions using each of satellite signals simultaneously received from the two or more auxiliary feeders, and compares satellite orientation direction information based on one auxiliary feeder and satellite orientation direction information based on the other auxiliary feeder to correct the first generated control signal to generate a final control signal for controlling a pointing direction of the antenna unit.

3. The satellite pointing system of claim 1, wherein, in the antenna unit, the two or more auxiliary feeders are spaced equally apart from each other at a predetermined interval based on the main feeder.

4. The satellite pointing system of claim 2, wherein, in the antenna unit, the two or more auxiliary feeders are spaced equally apart from each other at a predetermined interval based on the main feeder.

5. The satellite pointing system of claim 1, further comprising:
a switching unit switched under the control of the controller to select an operation of one auxiliary feeder or among the two or more auxiliary feeders.

6. A satellite pointing method of an automatic satellite tracking antenna using auxiliary LNBs, the satellite pointing method comprising:
an origin checking operation of determining, by a controller, a current location of an antenna to check an origin;
a satellite signal receiving operation of receiving, by the controller, a satellite signal by controlling operations of two or more auxiliary feeders configured to be coupled to the antenna;
a control operation of tracking, by the controller, a target satellite by analyzing strength of the satellite signal received in the satellite signal receiving operation and generating a control signal for controlling a pointing direction of the antenna based on the tracked target satellite information; and
a satellite pointing operation of moving, by the controller, a location of the antenna according to the control signal generated in the control operation,
wherein the satellite signal receiving operation further includes a first receiving operation of receiving a satellite signal from one selected auxiliary feeder, and
after the first receiving operation is performed,
the control operation further includes a first control operation of analyzing current location information of the target satellite using the satellite signal received in the first receiving operation and calculating a satellite orientation direction of the antenna according to the analyzed current location information to first generate a control signal,
after performing the first receiving operation and the first control operation,
the satellite signal receiving operation further includes a second receiving operation of receiving a satellite signal from another selected auxiliary feeder, and
after the second receiving operation is performed,
the control operation further includes: a second control operation of analyzing current location information of the target satellite using the satellite signal received in the second receiving operation, calculating a satellite orientation direction of the antenna according to the analyzed current location information, comparing the calculated satellite orientation direction and the satellite orientation direction information based on the first control operation, and correcting the control signal based on the first control operation to generate a final control signal for controlling a pointing direction of the antenna.

7. A satellite pointing method of an automatic satellite tracking antenna using auxiliary LNBs, the satellite pointing method comprising:
an origin checking operation of determining, by a controller, a current location of an antenna to check an origin;
a satellite signal receiving operation of receiving, by the controller, a satellite signal by controlling operations of two or more auxiliary feeders configured to be coupled to the antenna;
a control operation of tracking, by the controller, a target satellite by analyzing strength of the satellite signal received in the satellite signal receiving operation and generating a control signal for controlling a pointing direction of the antenna based on the tracked target satellite information; and
a satellite pointing operation of moving, by the controller, a location of the antenna according to the control signal generated in the control operation,
wherein
the satellite signal receiving operation further includes a simultaneous receiving operation of simultaneously receiving satellite signals from the two or more auxiliary feeders, and the control operation further includes a simultaneous control operation of analyzing current location information of a target satellite collectively using the satellite signals simultaneously received in the simultaneous receiving operation, calculating a satellite orientation direction of the antenna according to the analyzed current location information to first generate a control signal, calculating each of the satellite orientation directions using each of the satellite signals simultaneously received from the two or more auxiliary feeders, comparing the satellite orientation direction information based on one auxiliary feeder and the satellite orientation direction information based on the other auxiliary feeder to correct the first generated control signal to generate a final control signal for additionally controlling a pointing direction of the antenna.

8. The satellite pointing method of claim 6, wherein,
in the satellite pointing operation, the location of the antenna is moved according to the final control signal.

9. The satellite pointing method of claim 7, wherein,
in the satellite pointing operation, the location of the antenna is moved according to the final control signal.

\* \* \* \* \*